Patented Sept. 16, 1952

2,610,952

UNITED STATES PATENT OFFICE 2,610,952

RECOVERY OF LIQUID FUEL FROM SOLIDIFIED FUEL

Karl A. Fischer, Washington, D. C., and Otto F. Hecht, Philadelphia, Pa., assignors to the United States of America as represented by the Secretary of the Army No Drawing. Application June 14, 1949, Serial No. 99,106

15 Claims. (Cl. 252—319)

(Granted under the act of March 3, 1883, as amended April 30, 1928; 370 O. G. 757)

The invention described herein, if patented, may be manufactured and used by or for the Government for governmental purposes, without the payment to us of any royalty thereon.

This invention relates to the recovery of liquid hydrocarbon fuel from a solidified gel.

The solidification of liquid hydrocarbon fuels by emulsifying the same in alginic acid or in a water-soluble salt of alginic acid, followed by congealing in an aqueous solution of a calcium salt has been described in the foreign patent literature, e. g. in British Patent No. 450,206, De Granville, and British Patent No. 481,392, Pouettre. The solidified bodies obtained by the methods set forth in these patents burn with a slow flame without exploding, and are reconverted into liquid hydrocarbon fuel by squeezing, shredding, or similar mechanical operations.

Alginic acid is a polymeric substance found in nature and has up to now defied synthesis. The solidified gel structure in which the liquid hydrocarbon fuel is dispersed as tiny droplets consequently is postulated to be a water-insoluble polymeric calcium complex. This calcium complex is formed in accordance with the above cited patent literature by the reaction of alginic acid or sodium alginate (which forms the continuous phase of the hydrocarbon emulsion) with a calcium salt such as calcium chloride or calcium nitrate.

Our copending application Serial No. 99,107, filed concurrently, entitled "Solidification of Liquid Fuel," describes the formation of a solidified hydrocarbon gel by emulsifying liquid hydrocarbon fuel in an aqueous solution of a water-soluble polymeric substance characterized by repeating vinyl ($CH_2$:$CH$—) groups (such as alkali and other monovalent salts of polyacrylic acid, polymeric crotonic acid or polymeric vinyl acetic acid, e. g., sodium polyacrylate, potassium polyacrylate, ammonium polyacrylate, sodium polyvinyl acetate, sodium polycrotonate); the dispersant phase of the thus formed emulsion is solidified and rendered substantially water-insoluble by introducing it (preferably dropwise) into a congealing bath consisting, e. g., of a 10% (or stronger) aqueous solution of calcium chloride. The congealing bath converts the dispersant outer phase of the emulsion into pellet-shaped gels whose outer phase is postulated to be a substantially hydrocarbon-insoluble and water-insoluble calcium complex characterized by repeating (—$CH_2$·$CH<$) groups and formed by replacement of the monovalent, e. g. sodium or ammonium ions with calcium ions.

We have found that liquid hydrocarbon fuel dispersed in the solidified gel structure can be released chemically by water-solubilizing the water-insoluble polymeric calcium complex of the continuous phase by means of introducing monovalent positive ions into the complex so as to convert it into a water-soluble but gasoline-insoluble complex. This water-soluble complex easily disintegrates in an aqueous medium and releases the liquid hydrocarbon which will float on top without being contaminated by the gasoline-insoluble complex, and can be easily decanted.

Thus, it is an object of our invention to provide a method for the chemical recovery of liquid hydrocarbon fuel from a solidified gel structure wherein such hydrocarbon fuel is dispersed.

A further object of our invention is the conversion of a water-insoluble and gasoline-insoluble gasoline-supporting gel into a water-soluble but gasoline-insoluble complex.

A further object of our invention is a chemical method of releasing gasoline from a solidified gel residue left over from a mechanical gel disintegration.

Other objects and advantages of our invention will appear from the following detailed description of a preferred example of carrying the same into practice.

We have found that the water-insoluble solidified calcium complex which forms the continuous phase of the supporting gel structure of the solidified gasoline body can be converted into a water-soluble but gasoline-insoluble complex by contacting it intimately with an aqueous solution of a monovalent salt such as an alkali metal or ammonium salt capable of converting a water-insoluble calcium complex into a water-soluble complex by the introduction of positive monovalent ions, such as alkali or ammonium ions into the complex. Among such salts are sodium hexabimetaphosphate and alkali (e. g. sodium or potassium) or ammonium salts of nitrilo-triacetic acid and of hydrazino-tetra-acetic acid. The formula for sodium hexabimetaphosphate is $$Na_{12}[(PO_3)_2]_6$$

and the formulae for the monovalent salts of nitrilo-tri-acetic acid and of hydrazino-tetra-acetic acid are, respectively,

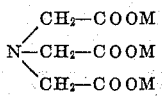

and

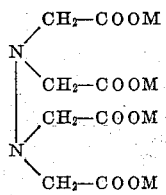

(e. g. trisodium-nitrilo-triacetate) (e. g. tetrasodium-hydrazino-tetra-acetate) wherein M stands for a monovalent alkali metal ion or ammonium; these nitrilo-triacetic acid and hydrazino-tetra-acetic salts may also be represented by the general formula

wherein $n$ in an integer from 1 to 2.

The following specific example illustrates a method of carrying our invention into practice by employing an aqueous solution of sodium hexabimetaphosphate as the reagent for the water-solubilization of the water-insoluble calcium complex which constitutes the supporting gel structure of the solidified gasoline body; it will be understood, however, that our method may be carried out as well by the use of aqueous solutions of the other above-mentioned monovalent salts which are capable of converting water-insoluble calcium complexes into water-soluble complexes, such as for instance, aqueous solutions of the sodium, potassium or ammonium salts of nitrilo-tri-acetic acid or of the sodium, potassium or ammonium salts of hydrazino-tetra-acetic acid.

*Example*

A solidified gel structure containing liquid hydrocarbon fuel dispersed therein and prepared by emulsifying gasoline in an approximately equal volume of a 2% solution of sodium polyacrylate followed by congealing in a 10% calcium chloride bath (with subsequent "aging"; that is, water elimination by syneresis and elimination of gasoline vapors beyond the supporting capacity of the gel structure), is intimately contacted with a 20% solution of sodium hexabimetaphosphate; the intimate contact is provided by shaking and/or kneading the gel in the solution for several minutes. The reaction vessel thereupon is permitted to stand for a few hours, whereupon the gel structure begins to disintegrate and liquefy and release the dispersed hydrocarbon fuel, which separates out in a layer and floats on top.

We ascribe the operation of our process to the conversion of the water-insoluble calcium complex of the gel structure into a water-soluble sodium-calcium complex by reacting with the sodium hexabimetaphosphate (or other reagents herein disclosed) in solution.

Separation and decantation of the gasoline layer after completion of the reaction is facilitated by adding an alcohol to the system to change interfacial tension.

After decantation of the gasoline layer, the residue may be subjected to distillation to recover any portion of the gasoline that was not released into the top layer. Experience indicates that it is not possible to remove gasoline by distilling the solidified gel prior to disintegrating the supporting structure.

It will be understood that it is not necessary to dissolve the gel structure completely, inasmuch as the dissolution of a part thereof is sufficient to release most of the gasoline dispersed in the gel.

The chemical recovery of gasoline from a solidified gel of the class described, may be also utilized to work over the mechanically disintegrated gel residue left over from a mechanical separation of liquid hydrocarbon fuel from a solidified gel. In this manner, total gasoline recovery of the gel is raised to almost 100%.

Variations from and modifications of the example of our invention, above set forth, will readily occur to the expert without, however, departing from the spirit of our invention. Such variations and modifications are therefore to be deemed with the scope of our invention, which we define by the appended claims.

We claim:

1. The process of recovering liquid hydrocarbon from a solidified gel structure essentially comprising a dispersed liquid hydrocarbon phase and a water-insoluble calcium complex as the continuous phase, comprising reacting said continuous phase with a solution of a salt whose positive radical is a member of the group consisting of alkali metal and ammonium and whose negative radical is a member of the group consisting of hexabimetaphosphate, nitrilo-triacetate and hydrazino-tetra-acetate, whereby said calcium complex is changed into a water-soluble and substantially hydrocarbon-insoluble complex; at least partly dissolving said water-soluble complex, whereby said liquid hydrocarbon phase is released; and separating said released liquid hydrocarbon from the residue.

2. The process of claim 1, wherein the final step of separating the hydrocarbon comprises distilling said liquid hydrocarbon from said dissolved continuous phase.

3. The process of recovering liquid hydrocarbon from a solidified liquid hydrocarbon phase and a water-insoluble calcium complex as the continuous phase, comprising reacting said continuous phase with a solution of sodium hexabimetaphosphate, whereby said calcium complex is converted into a water-soluble and substantially hydrocarbon-insoluble complex, at least partly dissolving said water-soluble complex, whereby said liquid hydrocarbon phase is released, and separating said released hydrocarbon from the residue.

4. The process of recovering liquid hydrocarbon from a solidified gel structure essentially comprising a dispersed liquid hydrocarbon phase and a water-insoluble and substantially hydrocarbon-insoluble calcium salt of alginic acid as the continuous phase, comprising reacting said continuous phase with a solution of a salt whose positive radical is a member of the group consisting of alkali metal and ammonium and whose negative radical is a member of the group consisting of hexabimetaphosphate, nitrilo-tri-acetate and hydrazino-tetra-acetate, whereby said calcium salt is changed into a water-soluble and substantially hydrocarbon-insoluble complex; at least partly dissolving said water-soluble complex, whereby said liquid hydrocarbon phase is released; and separating said released liquid hydrocarbon from the residue.

5. The process of recovering liquid hydrocarbon from a solidified gel structure essentially comprising a liquid hydrocarbon phase and a water-insoluble and substantially hydrocarbon-insoluble calcium salt of alginic acid as the continuous phase, comprising reacting said continuous phase with a solution of sodium hexabimetaphosphate, whereby said calcium salt is converted into a water-soluble and substantially hydrocarbon-insoluble alginate complex, at least partly dissolving said complex, whereby said liquid hydrocarbon phase is released, and separating said released hydrocarbon from the residue.

6. The process of recovering liquid hydrocarbon from a solidified gel structure essentially comprising a dispersed liquid hydrocarbon phase and a substantially water-insoluble and hydrocarbon-insoluble calcium complex characterized by repeating

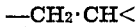
$-CH_2 \cdot CH<$ groups as the continuous phase, comprising reacting said continuous phase with a solution of a salt whose positive radical is a member of the group consisting of alkali metal and ammonium and whose negative radical is a member of the group consisting of hexabimetaphosphate, nitrilotriacetate and hydrazino-tetra-acetate, whereby said calcium complex is changed into a water-soluble and substantially hydrocarbon-insoluble complex characterized by

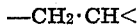
$-CH_2 \cdot CH<$ groups; at least partly dissolving said water-soluble complex in water, whereby said liquid hydrocarbon phase is released; and separating said released liquid hydrocarbon from the residue.

7. The process of recovering liquid hydrocarbon from solidified gel structure essentially comprising a liquid hydrocarbon phase and a water-insoluble calcium complex characterized by repeating

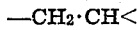
$-CH_2 \cdot CH<$ groups comprising liquefying at least part of said continuous phase with an aqueous solution of sodium hexabimetaphosphate, whereby said liquid hydrocarbon phase is released; and separating said released liquid hydrocarbon from the residue.

8. The process of recovering liquid hydrocarbon from a solidified gel structure essentially comprising a dispersed liquid hydrocarbon phase and a water-insoluble calcium complex as the continuous phase, comprising reacting said continuous phase with a solution of a salt having the general formula

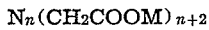
$N_n(CH_2COOM)_{n+2}$ wherein $n$ is an integer from 1 to 2 and wherein M is a member of the group consisting of alkali metal and ammonium, whereby said calcium complex is changed into a water-soluble and substantially hydrocarbon-insoluble complex; at least partly dissolving said water-soluble complex, whereby said liquid hydrocarbon phase is released; and separating said released liquid hydrocarbon from the residue.

9. The process of recovering liquid hydrocarbon from a solidified gel structure essentially comprising a dispersed liquid hydrocarbon phase and a water-insoluble calcium complex as the continuous phase, comprising liquefying at least part of said continuous phase by reacting it with an aqueous solution of a monovalent salt of nitrilo-triacetic acid, whereby said liquid hydrocarbon phase is released; and separating said released liquid hydrocarbon from the residue.

10. The process of recovering liquid hydrocarbon from a solidified gel structure essentially comprising a dispersed liquid hydrocarbon phase and a water-insoluble calcium complex as the continuous phase, comprising liquefying at least part of said continuous phase by reacting it with an aqueous solution of trisodium-nitrilo-triacetate, whereby said liquid hydrocarbon phase is released; and separating said released liquid hydrocarbon from the residue.

11. The process of recovering liquid hydrocarbon from a solidified gel structure essentially comprising a dispersed liquid hydrocarbon phase and a water-insoluble calcium complex as the continuous phase, comprising liquefying at least part of said continuous phase by reacting it with an aqueous solution of a monovalent salt of hydrazino-tetra-acetic acid, whereby said liquid hydrocarbon phase is released; and separating said released liquid hydrocarbon from the residue.

12. The process of recovering liquid hydrocarbon from a solidified gel structure essentially comprising a dispersed liquid hydrocarbon phase and a water-insoluble calcium complex as the continuous phase, comprising liquefying at least part of said continuous phase by reacting it with an aqueous solution of tetra-sodium hydrazino-tetra-acetate, whereby said liquid hydrocarbon phase is released; and separating said released liquid hydrocarbon from the residue.

13. The process of recovering liquid hydrocarbon from a solidified gel structure essentially comprising a dispersed liquid hydrocarbon phase and a substantially water-insoluble and hydrocarbon-insoluble calcium complex as the continuous phase, comprising mechanically separating part of said dispersed hydrocarbon from said gel; thereafter reacting the continuous phase of the residue of said gel with a solution of a salt whose positive radical is a member of the group consisting of alkali metal and ammonium and whose negative radical is a member of the group consisting of hexabimetaphosphate, nitrilo-triacetate and hydrazino-tetra-acetate, whereby said calcium complex is changed into a water-soluble and substantially hydrocarbon-insoluble complex; at least partly dissolving said water-soluble complex in water, whereby remaining dispersed liquid hydrocarbon is released; and separating said released hydrocarbon from the residue.

14. The process of recovering liquid hydrocarbon from a solidified gel structure essentially comprising a dispersed liquid hydrocarbon phase and a substantially water-insoluble and hydrocarbon-insoluble calcium complex as the continuous phase, comprising mechanically separating part of said dispersed hydrocarbon from said gel, and thereafter reacting the residue of said gel with an aqueous solution of sodium hexabimetaphosphate, whereby at least part of said residue is dissolved and hydrocarbon is released; and separating said released liquid hydrocarbon from the residue.

15. The process of recovering liquid hydrocarbon from a solidified gel structure essentially comprising a dispersed liquid hydrocarbon phase and a substantially water-insoluble and hydrocarbon-insoluble continuous phase, said continuous phase being selected from the group consisting of calcium salt of alginic acid and a calcium complex characterized by repeating —$CH_2 \cdot CH<$ groups, comprising replacing the calcium ions of said continuous phase at least partly by monovalent ions selected from the group consisting of alkali metal and ammonium, whereby said continuous phase is converted into a water-soluble and hydrocarbon-insoluble complex; at least partly dissolving said last-named complex in an aqueous medium whereby said dispersed liquid hydrocarbon is released; and separating said released hydrocarbon from the residue.

KARL A. FISCHER.
OTTO F. HECHT.

REFERENCES CITED

The following references are of record in the file of this patent:

UNITED STATES PATENTS

| Number | Name | Date |
|---|---|---|
| 2,167,327 | Talley et al. | July 25, 1939 |
| 2,443,378 | Dittmar et al. | June 15, 1948 |

FOREIGN PATENTS

| Number | Country | Date |
|---|---|---|
| 450,206 | Great Britain | July 13, 1936 |
| 481,392 | Great Britain | Mar. 10, 1938 |